Aug. 23, 1938.  H. E. DALL  2,127,501

FLUID FLOW MEASURING MEANS

Filed Dec. 28, 1935

INVENTOR.
HORACE E. DALL
BY
*Cornelius D. Ehret*
ATTORNEY.

Patented Aug. 23, 1938

2,127,501

UNITED STATES PATENT OFFICE 2,127,501

FLUID FLOW MEASURING MEANS

Horace E. Dall, Luton, England, assignor to Leeds and Northrup Company, Philadelphia, Pa., a corporation of Pennsylvania Application December 28, 1935, Serial No. 56,422

22 Claims. (Cl. 73—211)

My invention relates to means for indicating or measuring rates of fluid flow, more particularly to conduit constrictions, and has for an object the provision of a conduit constriction whose discharge coefficient is substantially constant irrespective of the rate of flow or the nature of the fluid passing through the same.

Heretofore the use of orifices, Venturi sections, nozzles or other types of constrictions, in fluid conduits for the accurate indication or metering of the rates of flow or integrated flow of fluids, has been limited to those types of fluid and to those rates of flow for which the value of the coefficient of discharge of the constriction is sensibly constant. Rates of flow or integrated flows of fluids having appreciable viscosity, such as the majority, if not all, of the oils, including mineral oils, hydrogen gas, saturated steam and methane, except under restricted conditions, cannot be indicated or measured with suitable degree of accuracy because the coefficient of discharge of the constriction does not remain constant with varying rates of flow. Thus the coefficient of discharge of a constriction of known types changes with the rate of flow, with the viscosity, and with the density of the fluid; errors as great as sixty per cent may arise from a change in one of the aforesaid conditions.

In carrying out my invention, in one form thereof I provide a constriction such as an orifice of such character and dimensioning that with varying flow rate the forces tending to increase the discharge coefficient are substantially balanced by the forces tending to decrease the discharge coefficient; the result is a constriction or orifice whose discharge coefficient remains sensibly constant over that wide range wherein the discharge coefficients of prior types of constrictions were unstable and subject to substantial deviation from constant values. More specifically, I shape the wall forming a passage to the constriction or orifice to provide an entrance suitably diminishing in cross section, including a frusto-conical entrance passage. For an orifice, the length of the entrance is preferably, though not necessarily, less than the total thickness of the orifice plate, the wall of the remainder of the orifice being substantially parallel to the axis of the fluid flow. The character of change of cross section of the entrance in the direction of flow and the ratio of the smallest diameter of the orifice to the length of the entrance bear to each other a predetermined relationship, determined with reference to the ratio of the smallest diameter of the orifice to the inner diameter of the conduit. The result is an orifice plate or constriction of structure and dimensions such that the discharge coefficient remains sensibly constant throughout a much greater range of rates of flow of fluids, regardless of their viscosities and/or densities.

Further in accordance with my invention the square root of the head, or the square root of the difference between pressures on the upstream and downstream sides of the orifice plate or constriction, is directly proportional to the rate of flow of fluid passing through the orifice irrespective of wide changes in its viscosity, density or rate of flow. By the term "rate of flow" I mean the average velocity of the fluid through either the orifice or the conduit, or the quantity of fluid passing per unit of time through either the conduit or the orifice expressed either in volumetric or weight units.

My invention resides in the system and apparatus of the character hereinafter described and claimed.

For a more complete understanding of my invention, reference is had to the accompanying drawing, in which.

Figure 1:
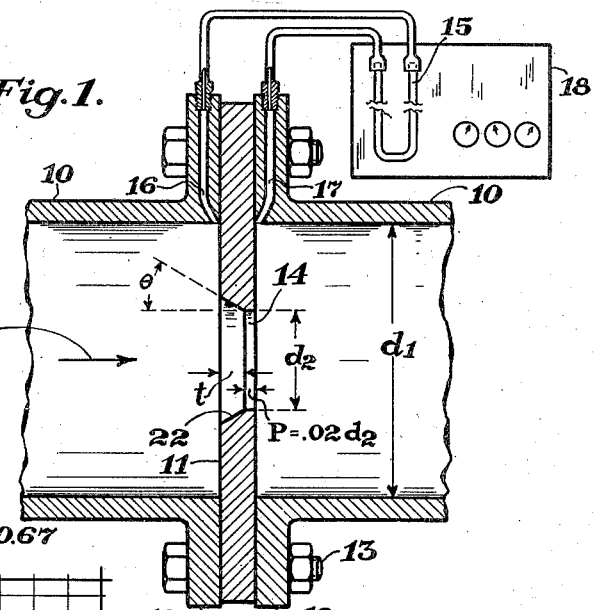
Figure 1 is a sectional elevation of an orifice plate embodying my invention mounted in a conduit, together with a diagrammatic representation of an integrating meter.

Referring to the drawing, I have shown my invention in one form thereof as applied to the measurement or metering of fluid passing through a conduit 10. An orifice plate 11 is suitably secured between flanges 12 of the conduit, as by a series of bolts 13. Gaskets or other sealing material may be interposed between the adjacent surfaces of the orifice plate and flanges to insure a fluid-tight connection.

The orifice plate 11 is provided with an opening or orifice 14 the smaller diameter $d_2$ of which bears a predetermined relation to the inner diameter $d_1$ of the pipe or conduit 10. As is well understood by those skilled in the art, the constriction formed by the orifice and its plate causes an acceleration of the fluid as it passes through the opening 14 with a resultant fall of pressure. The pressure on the upstream or left hand side of the orifice, as viewed in Fig. 1, is greater than on the downstream or right hand side of the orifice. The difference between the pressures is generally referred to as the "head". Knowing the head, which may be readily determined from a manometer 15 (or equivalent), the respective legs of which are connected to conduit taps 16 and 17 leading to opposite sides of the orifice plate 11, the rate of flow, for convenience expressed in the metric system, can be readily calculated from the flow equation expressed as $$V = \frac{CA\sqrt{2gH}}{\sqrt{R^4-1}}$$

$$Q = \frac{CAW\sqrt{2gH}}{\sqrt{R^4-1}}$$

where
  $V$ is the rate of flow in cubic centimeters per second
  $Q$ is the rate of flow in grams per second
  $W$ is the density in grams per cubic centimeter of the fluid being measured
  $C$ is the coefficient of discharge
  $A$ is the cross sectional area of the opening of the pipe in square centimeters,
  $g$ is a gravitational constant expressed in centimeters per second per second
  $H$ is the head in centimeters of the fluid being measured
and $$R = \frac{d_1}{d_2}$$

where
  $d_1$ is the inside diameter of the pipe in centimeters, and
  $d_2$ is the diameter of the orifice in centimeters.

Ordinarily the manometer 15 is filled with a given fluid, for example water or mercury, usually differing in density from the fluid under measurement. Under this situation the following equation holds:

$$wh = WH$$

or $$H = \frac{wh}{W}$$

where
  $w$ is the density of the manometer fluid in grams per cubic centimeter, and
  $h$ is the observed manometer head in centimeters.

As shown, the manometer 15 generically represents a differential pressure responsive device utilized as an operating or control element for an integrating meter 18 of any suitable type; it may, for example, be of the character disclosed in Mears and Wilson U. S. Letters Patent No. 1,993,527, dated March 5, 1935.

By means of the integrating meter 18 the total amount of fluid passed through the orifice in a given time is automatically determined, irrespective of the rate of flow, providing the discharge coefficient remains constant. Stated differently, the accuracy of the large majority, if not all, of the integrating meters now available, depends upon all factors in the aforementioned flow equation remaining constant except the head or differential pressure created across the orifice. Therefore when the discharge coefficient varies from a fixed value with changes in rates of flow and characteristics, such as viscosity and density of the fluid, errors are introduced in the indication or measurement of the rate of flow of the fluid or its integrated total quantity.

The value of the coefficient of discharge is a number, generally less than unity, which is the ratio of the actual quantity of fluid passing through a constriction per unit of time to the theoretical quantity of fluid passing through the constriction per unit of time. As is well understood in the art, the value of the discharge coefficient is not always constant; it varies to some extent with the rate of flow, the size of the constriction, and the viscosity and density of the fluid. For a particular form of constriction, variations in the coefficient of discharge may be seen from a curve whose ordinates are coefficients of discharge plotted against flow criteria as abscissae. Examples of such curves are shown in Fig. 2.

The flow criterion is a non-dimensional relation between rate of flow in weight units, the linear size of the constriction and the absolute viscosity of the fluid expressed as $$F = \frac{G}{d_2 u}$$

where
  $G$ equals the discharge in weight units per unit of time, i. e., grams per second;
  $d_2$ equals the diameter of the orifice in units of length, i. e., centimeters; and
  $u$ equals the absolute viscosity in poises.

Figure 2:
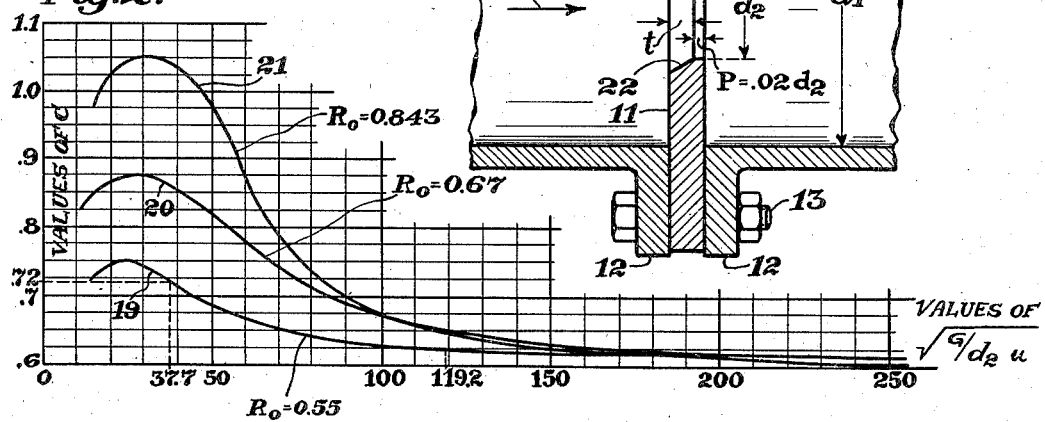
Fig. 2 shows variation of discharge coefficients with differing flow criteria.

Referring to Figure 2, the curves 19–21, inclusive, illustrative of thin plate sharp-edge orifices of the prior art, are plotted for convenience with the square root values of the flow criteria as abscissae and discharge coefficients as ordinates; it will be seen that for the higher values of the flow criterion the coefficient of discharge remains substantially constant. As the flow criterion decreases in value the discharge coefficient increases to a maximum and then rapidly decreases. Due to the rapid changes in the discharge coefficient with variation of the square root value of the flow criterion between fifteen and one hundred and fifty, the effect on the discharge coefficient of changes in the viscosity, the rate of flow, or density of the fluid is material, particularly when the orifice ratio $R_0$ (diameter of the orifice divided by the diameter of the conduit) is large.

For example, as indicated by curve 21 with orifice ratios $R_0$ of the order of eight-tenths, a maximum change in the discharge coefficient of sixty per cent may occur with variation of the flow criterion.

Referring again to the flow criterion $$\frac{G}{d_2 u}$$

it will be seen that the value of the flow criterion varies in direct proportion to factor $G$, the rate of flow. In a substantial number, if not the majority, of commercial metering applications, ten to one changes in the rate of flow of the fluid are common and must be taken into consideration. As the rate of flow increases or decreases, the flow criterion changes a corresponding amount. Therefore, with a change in the flow criterion from 22,500 ($150^2$) to 2,250 ($47.5^2$) (a ten to one change) the discharge coefficient as read from curve 21 of Fig. 2 changes from 0.63 to 0.99, an increase of fifty-seven per cent, which increase is reflected as an error of the same order of magnitude in the indications of rates of flow, integrated rates of flow, or in the readings of fluid flow indicating or measuring instruments now in general use. As long as the coefficient of discharge remains constant, the square root of the head is directly proportional to the rate of flow of fluid passing through the orifice. With a changing discharge coefficient the head deviates from the square root law and so introduces the aforesaid error. In accordance with my invention, the coefficient of discharge is sensibly constant or, stated differently, the square root of the head remains proportional to the rate of flow of the fluid for flow criteria above approximately 100. In this connection it is to be understood that the manometer 15 may be connected across the orifice at suitable points spaced on opposite sides of the orifice plate, for example, the conduit tap 17 may be located at or near the vena contracta.

As I have already stated, in accordance with my invention the forces or factors tending to increase the discharge coefficient are balanced by the forces or factors tending to decrease the discharge coefficient. To achieve the balance or the neutralization of the forces with the resultant sensibly constant discharge coefficient for substantially all flow criteria, I have found that the magnitude of the forces may be controlled by properly constructing and dimensioning the constriction. For example, referring to Fig. 1, on the upstream side of the orifice plate 11 the wall forming the orifice is beveled, as at 22, the resultant conical entrance terminating a predetermined distance from the downstream side of the orifice plate. This entrance portion thus converges, or diminishes in cross section in the direction of flow. More specifically, the conical entrance forms a frustum of a cone, the smaller diameter of which is fixed by the downstream diameter $d_2$ of the orifice. The distance P from the downstream side of the orifice plate 11 to the beginning of the beveled surface 22 may be varied to change the area of that surface or the length of the frustum may be varied, or both may be varied.

Figure 3:
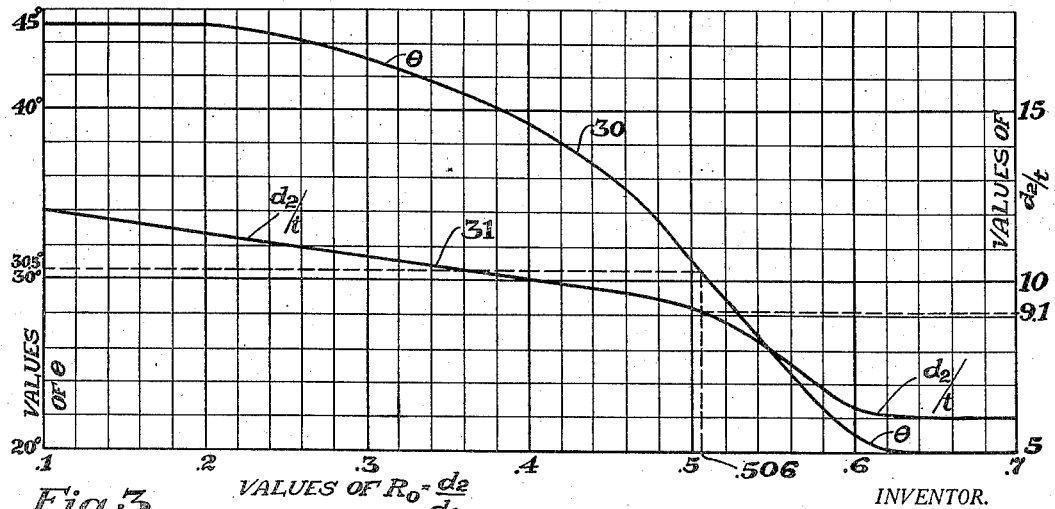
Fig. 3 illustrates curves by means of which constrictions may be dimensioned to produce constant discharge coefficients irrespective of flow criteria.

The relationship between the orifice ratio $R_0$ ($d_2$ divided by $d_1$), the angle $\theta$, the ratio of the orifice diameter $d_2$ to the height $t$ of the frustum of the cone, and the length P of the walls of the orifice which are parallel to the axis of the stream or path of the fluid, is in general determinable by means of curves 30 and 31 of Fig. 3; curve 30 is plotted with orifice ratios $R_0$ as abscissae and the angles $\theta$ as ordinates; the curve 31 has values of $$\frac{d_2}{t}$$

as ordinates and orifice ratios $R_0$ as abscissae. For any given problem it will be apparent a suitable orifice ratio must be selected. Having the orifice ratio, the remaining dimensions of the orifice may be readily determined in accord with the relations illustrated by the curves 30 and 31.

Although constrictions formed in accordance with my invention have relatively constant discharge coefficients for all values of the flow criterion above substantially 100, a standard thin-plate sharp-edged orifice is satisfactory for relatively high values of the flow criterion. For this reason the flow criterion is preferably first determined for any given problem in fluid flow.

By way of example, it will be assumed it is required to meter the flow through a five inch pipe of a crude mineral oil, density 0.921 gram per cubic centimeter, absolute viscosity 13.7 centipoises, and the rate of flow of which varies between 1450 and 14,500 gallons per hour.

It will be remembered the flow criterion equals the discharge in grams per second divided by the product of the orifice diameter in centimeters and the viscosity in poises. From the data assumed, the maximum rate of flow of 14,500 gallons per hour is known. Converted to grams per second the maximum rate of flow is equal to 14,060 grams per second. The viscosity in poises is equal to 0.137. For convenience, the metric system will be used and a further assumption made of the development of a head or differential pressure across the orifice of 60 inches, 152.4 centimeters, of water, whose density is unity, for a maximum flow; although the orifice diameter $d_2$ is unknown it may now readily be calculated from the flow equation discussed above and there expressed as $$Q = \frac{CAW\sqrt{2gH}}{\sqrt{R^4-1}}$$

Rewriting the flow equation and substituting for H its equivalent of $$\frac{wh}{W}$$

$$\frac{C}{\sqrt{R^4-1}} = \frac{Q}{AW\sqrt{2g\frac{wh}{W}}} = \frac{Q}{A\sqrt{2gwhW}}$$

and substituting the values given in the problem $$\frac{C}{\sqrt{R^4-1}} = \frac{14,060}{44.25 \times 126.7\sqrt{152.4 \times .921}} = 0.2117$$

Inasmuch as the coefficient of discharge for standard thin-plate sharp-edged orifices is approximately 0.62 (Fig. 2) this value may be used for the determination of R.

Thus:

$$\frac{.62}{\sqrt{R^4-1}} = .2117 \text{ and } R^4 - 1 = \left\{\frac{.62}{.2117}\right\}^2 = 8.58$$

and $$R = 1.76$$

Since R is equal to the diameter of the orifice divided by the diameter of the pipe given as 5 inches which is equal to 12.7 centimeters $$d_2 = \frac{12.7}{1.76} = 7.219 \text{ centimeters.}$$

The orifice ratio $$R_0 = \frac{1}{R} = \frac{1}{1.76} = .568$$

The flow criterion may now be calculated $$F = \frac{G}{d_2 u} = \frac{14060}{7.219 \times 0.137} = 14217$$

and $$\sqrt{F} = \sqrt{14,217} = 119.2$$

Referring now to Fig. 2, it will be observed that for a flow criterion the square root value of which is 119.2, the discharge coefficient, represented by the curve 19 (the curve for an orifice ratio nearest 0.568), remains fairly constant until the square root value of the flow criterion approaches 100, while curves 20 and 21 indicate substantial deviations from the assumed value of discharge coefficient of 0.62 for thin-plate sharp-edged orifice.

In normal practice the rate of flow varies from time to time and it is difficult and commercially impracticable to maintain the flow constant. Usually the rate of flow may vary as much as ten to one. It is therefore desirable to calculate the flow criterion for a flow ten per cent of the maximum flow.

$$F = \frac{G}{d_2 u} = \frac{0.10 \times 14,060}{7.219 \times 0.137} = 1422$$

$$\sqrt{F} = 37.7$$

Referring again to curve 19 of Fig. 2 for a square root value of the flow criterion of 37.7, the discharge coefficient has increased 16% to the high value of 0.72 and with further decrease in the flow criterion a greater change in the discharge coefficient occurs. Under the assumed conditions accurate metering with the ordinary thin-plate sharp-edge orifice is difficult, and impractical.

In accordance with my invention, I have found that the average value of the discharge coefficient for the type of orifice shown in Fig. 1 is 0.80. Therefore, in calculating the orifice ratio $R_0$ by means of which the orifice is constructed in accordance with my invention, this value of 0.80 is used in the flow equation. Referring again to the flow equation $$Q = \frac{CA\sqrt{2ghWw}}{\sqrt{R^4-1}}$$

Rewriting the equation and substituting therein the known values we find $$\frac{C}{\sqrt{R^4-1}} = \frac{Q}{A\sqrt{2ghWw}} = \frac{14060}{44.25 \times 126.7\sqrt{152.4 \times .921}} = 0.2117$$

$$R^4 - 1 = \left\{\frac{.80}{.2117}\right\}^2 = 14.28$$

$$R = 1.974 = \frac{d_1}{d_2} = \frac{12.7}{d_2}$$

$$R_0 = \frac{1}{R} = \frac{1}{1.974} = .506 : d_2 = 6.43 \text{ centimeters}$$

Substituting the value of $d_2$ in the flow criterion equation $$F = \frac{G}{d_2 u} = \frac{14060}{6.43 \times 0.137} = 15956$$

and $$\sqrt{F} = 125.9$$

Referring now to Fig. 3, the orifice for the assumed problem has an orifice ratio of $R_0$ of 0.506. Reading the corresponding value of the angle $\theta$ from curve 30, it will be found the angle of the beveled surface 22 must be inclined 30.5° from the axis of the orifice which is also the axis of flow. The angle of the cone formed by the projection of the beveled surfaces is 61°. Similarly, the quotient of the orifice diameter divided by the length $t$ of the frustum of the cone is found to be 9.1. Therefore $$t = \frac{d_2}{9.1} = \frac{6.43}{9.1} = 0.7066 \text{ centimeters}$$

The length of the cylindrical section P is of the order of two per cent of the orifice diameter or 0.1286 centimeter. The width of the orifice plate is the sum of $t$ and P or 0.8352 centimeter. Since all necessary dimensions have now been determined it is relatively easy for those skilled in the art to manufacture the orifice.

By means of much investigation I have found that the orifice dimensioned as set forth in the foregoing will have a relatively constant discharge coefficient. For example, the square root value of the flow criterion for maximum flow was determined as 125.9. From fully verified determinations the change in the discharge coefficient, with changes in flow down to a square root value of the flow criterion of 25, has been found not to exceed a plus or minus one per cent. In other words, if the square root value of the flow criterion is reduced by virtue of decreased rate of flow or otherwise, to a value of 25, corresponding to a ninety-six per cent decrease in rate of flow, the discharge coefficient changes only an amount of the order of one percent and even this change is confined entirely to the range of the lower values of the flow criterion. In this connection it will be remembered that for the standard orifice of prior practice the variation in the discharge coefficient was greater than sixteen per cent with a decreased rate of flow to only ten per cent of maximum flow. This variation of sixteen per cent corresponded with a change in the square root value of the flow criterion from 119.2 to 37.7.

In the foregoing explanation only changes in the rate of flow or the factor G were assumed. Of no less importance are the other factors, to wit, the diameter $d_2$ of the orifice and the viscosity $u$, which enter into the flow criteria of $$\frac{G}{d_2 u}$$

Variations in the density in changing the value of G expressed in weight units per unit of time directly affect the value of the flow criterion. Accordingly, with flow criteria below 10,000, variation in density for the thin-plate sharp-edge orifices will produce a substantial change in the discharge coefficient. In accordance with my invention, however, the discharge coefficient of the constriction remains sensibly constant and the head is always proportional to the square of the rate of flow for values of flow criteria down to approximately 100.

In this connection it is to be observed that a change in density may cause a departure from the square root law in the level of the fluid used in the manometer 15. This departure is not due to a change in the coefficient of discharge but is due to the use of a liquid in the manometer, such, for example, as mercury, which differs from the fluid under measurement. Errors so introduced may be corrected, as, for example, in the manner described in Rosecrans U. S. Letters Patent No. 1,993,707, dated March 5, 1935, or the fluid used in the manometer may be the fluid under measurement; in the latter case the head as indicated by the manometer will be directly proportional to the square of the rate of flow irrespective of density.

Referring again to the calculations of the orifice ratio $R_0$ it will be remembered that a value of 0.80 was assumed for the discharge coefficient C. The coefficients of discharge for orifice constrictions embodying my invention in general lie between seven-tenths and nine-tenths. The exact value of the coefficient of discharge may be checked in accordance with methods well understood by those skilled in the art, such as by measuring the flow of a fluid through the orifice for a given length of time and dividing the measured amount by the theoretical amount of the fluid which should have flowed through the orifice under identical conditions. The result or quotient represents the numerical value of the coefficient of discharge.

In the foregoing example the orifice ratio was selected to produce for a maximum rate of flow a head of approximately sixty inches of water. If for a maximum rate of flow the head is of small importance, the orifice ratio may be selected arbitrarily provided the flow criterion for minimum flow is greater than 100. For example it will be assumed a fluid to be measured is to flow through a pipe the internal diameter of which is four inches. From prior experience for a given rate of flow it is known that an orifice the diameter of which is two inches may be used. The orifice ratio is then calculated and found to be 0.5. The remaining dimensions are read directly from curves 30 and 31. The orifice so constructed will have a sensibly constant coefficient of discharge for values of the flow criterion down to approximately 100, irrespective of viscosity, density or rate of flow of the fluid.

Again referring to Fig. 3, if for a given orifice ratio between 0.1 and 0.7 the orifice is dimensioned so that the angle θ of the beveled entrance and the ratio of the orifice diameter $d_2$ to the length $t$ of the beveled portion bear the relationship indicated by the curves 30 and 31, the discharge coefficient remains substantially constant for fluid flow, the flow criteria of which ranges upwardly from about 100. More specifically, if the orifice ratio is 0.2 the maximum deviation in the discharge coefficient for square root values of flow criteria down to 12 is plus or minus three-quarters per cent. A deviation not greater than a plus or minus one per cent in the discharge coefficient is obtained for orifice ratios of 0.4, 0.5, 0.6 and 0.7 down to the respective square root values of the flow criterion of 15, 20, 25 and 52. Accordingly, the pressure exerted on the manometer 15 very closely follows the square root law.

For viscous fluids such as crude and derivative mineral oils, the deviation in the discharge coefficient becomes most pronounced for flow criteria encountered in the normal commercial transportation and measurement of such fluids through pipes or conduits, including inter-regional pipe lines. Because its discharge coefficient is sensibly constant, a constriction constructed in accordance with my invention is entirely suitable for the accurate measurement of such viscous fluids. It is also suitable for accurate measurement of fluids whose kinematic viscosity (absolute viscosity divided by density) is high, such, for example, as steam, hydrogen, relatively hot air at low pressure, natural gas, methane, etc.; for all fluids the discharge coefficient never rises above nor falls below one per cent of its normal or median value.

The constriction constructed as described above may be used for the accurate measurement of all fluids; the discharge coefficient will remain sensibly constant for flow criteria ranging upwardly from approximately 100, it being understood, of course, that the orifice ratio $$\frac{d_2}{d_1}$$

and the dimensions shall bear the relationship indicated by curves 30 and 31.

While my invention shall not be limited in any way by the following theory, the predetermined relationship of the orifice dimensions accomplishes uniformity in the discharge coefficient for practically all values of the flow criterion because the forces or effects tending to increase the discharge coefficient are substantially balanced by the forces or effects tending to decrease the discharge coefficient. For example, in the case of a thin-plate sharp-edged orifice where the jet formed is smaller than the orifice bore, the friction in the stream and against the upstream face of the orifice plate due to viscosity reduces the momentum of the streamlines forming the jet and causes this jet to increase in diameter, thus increasing the discharge coefficient. A second factor which tends to increase the discharge coefficient is the changed distribution of velocity in the pipeline arising because of viscosity. As the viscosity increases, that portion of the fluid adjacent the walls of the conduit is retarded and because of the resultant higher central or axial velocity less acceleration is required in passing the constriction. An increase in discharge coefficient occurs as the central velocity increases. These two factors, forces or effects which tend to increase the discharge coefficient become of increasingly greater importance with thin-plate sharp-edged orifices for flow criteria between 900 and 10,000. The effect is clearly shown in Fig. 2 where the discharge coefficient rapidly rises as the square root values of the flow criteria decrease from 100 to 30.

However, as the square root values of the flow criteria approach 25, the viscous shear forces predominate. These forces are in the fluid itself and are due to the presence of the upstream surfaces of the conduit wall and the orifice plate, causing more head to be required for the acceleration thus reducing the discharge coefficient.

In accordance with my invention, the effect of the conical entrance portion in plate 11 is to enlarge the jet sufficiently to compensate for the effect of viscosity which tends to decrease the size of the jet. The residual effect of the enlarged jet, when added to the effect of the higher central velocity, is proportioned so as to balance the shear forces, the net effect of which is to prevent all except negligible changes in the coefficient of discharge.

In the three factors mentioned, the adjoining areas washed by or at least in contact with the fluid affect the magnitude of the forces. Consequently the dimensions predicated upon the curves 30 and 31, Fig. 3, are determined with reference to the orifice ratio. For orifice ratios from 0.10 to 0.21, the angle θ of the beveled surface 22 remains fixed at 45°, while the ratio of the orifice diameter $d_2$ to the length $t$ of the conical approach decreases linearly. For orifice ratios above 0.21 the angle θ decreases with increasing orifice ratios until the orifice ratio is equal to 0.62 at which value the angle θ is 20°. For orifice ratios between 0.62 and 0.70 a constant discharge coefficient will be obtained if the entance angle θ is twenty degrees and the ratio of the orifice diameter to the length of the conical entrance is six. The exact value of the coefficient of discharge for this range, as well as for every different value of the orifice ratio, is determined in the manner already set forth. The coefficient of discharge remains constant, however, for values of the flow criterion as low as 100 irrespective of the type of fluid, its density, viscosity or rate of flow.

The effect of a change in the discharge coefficient with a change in the flow criterion is to change the differential pressure or head, and in consequence the response of the manometer 15 or other device responsive to the head. Consequently, square root value of the head (or differential pressure across the orifice) does not vary in direct proportion to the changes in the rate of flow. In other words, if the flow through the orifice were reduced by one-half, the head would not be reduced one-quarter, but to a fraction considerably different. The differential pressure or head would represent a complex function of rate of flow and viscosity from which neither rate of flow nor viscosity could be readily separated. In accordance with my invention, however, the pressure exerted by the flow upon manometer 15, or any other device responsive to changes in head, closely follows the square root law because the effect of viscosity and the other variables are prevented from changing the discharge coefficient.

Accordingly, instruments for measuring or indicating heads or rates of flow, and, as illustrated, integrating meters, as 18, may be used for the accurate indication or measurement of rates of flow or total flow of fluids of types accurate measurements of whose rates of flow or integrated flows heretofore have been exceedingly difficult if not impossible.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim is:

1. A constriction for a fluid conduit developing a head for flow criteria ranging upwardly from approximately 100 substantially proportional to the rate of flow comprising a wall forming a constricted fluid-passage, said fluid-passage having an entrance, the wall-portion of which lies at an angle of between twenty and forty-five degrees to the longitudinal axis of said conduit and the quotient of the distance across the smallest cross sectional area of the entrance divided by the length of said entrance having a value between six and twelve.

2. An element for measurement of flow of fluid in a conduit comprising a plate provided with an opening of less diameter than said conduit to form a constriction in said conduit, the wall forming the entrance portion of said opening being disposed at an angle to the longitudinal axis of said opening of between twenty degrees and forty-five degrees and the quotient of the shortest diameter of said opening divided by the length of said beveled portion having a value between six and twelve.

3. An element for measurement of flow of fluid in a conduit comprising a plate provided with an opening of less diameter than said conduit to form a constriction in said conduit, the entrance portion of said opening being beveled at an angle between twenty degrees and forty-five degrees and the quotient of the shortest diameter of said opening divided by the length of said beveled portion having a value gradually increasing from six to twelve as the quotient of the shortest diameter of said opening divided by the diameter of said conduit decreases from seven-tenths to one-tenth.

4. An element for metering flow of fluid in a conduit comprising a plate provided with an opening of less diameter than said conduit to form a constriction in said conduit, the entrance portion of said opening being beveled at an angle between about thirty-four and one-half degrees and forty-five degrees, and the quotient of the shortest diameter of said opening divided by the length of said beveled portion having a value which increases linearly as the quotient of the shortest diameter of said opening divided by the diameter of said conduit decreases from forty-seven-hundredths to ten-hundredths.

5. An element for metering flow of fluid in a conduit comprising a plate provided with an opening of less diameter than the conduit, the opening having a conical entrance terminating and followed by a short cylindrical section, the angle of said conical entrance lying between twenty degrees and forty-five degrees and bearing such a relation with respect to the length of the conical entrance for a given ratio of the smallest diameter of said opening to the diameter of the conduit as to control and prevent changes in the discharge coefficient with wide changes in the rate of flow of said fluid.

6. An element for metering flow of fluid in a conduit comprising a plate provided with an opening of less diameter than the conduit to form a constriction in said conduit, the entrance portion of said opening being beveled at an angle of twenty degrees and the quotient of the smallest diameter of the opening divided by the length of said beveled entrance portion being equal to six for values of the quotient of the smallest diameter of said opening divided by the internal diameter of said conduit between sixty-two-hundredths and seventy-hundredths.

7. An orifice plate provided with an orifice, the walls forming the entrance to the orifice being beveled at an angle not greater than forty-five degrees to form a conical entrance thereto of length not less than about eighty-three thousandths of the smallest diameter of said orifice, the angle of said conical entrance and the length of said conical entrance being proportioned with reference to the viscous shear forces which tend to reduce the discharge coefficient and the forces which tend to increase the discharge coefficient so that a substantially constant discharge coefficient is obtained for flow of viscous fluids.

8. An orifice plate having an orifice therein, the walls forming said orifice being beveled to form an entrance in the shape of a frustum of a cone, the angle of bevel of said walls lying between twenty and forty-five degrees, and the distance between the parallel faces of said frustum being not less than about eighty-three thousandths of the smallest diameter of said orifice and not greater than about one hundred and sixty-seven thousandths of said diameter, said angle and said distance being so related that the forces tending to increase and to decrease the discharge coefficient are maintained equal to maintain relatively constant the discharge coefficient.

9. An orifice plate provided with an orifice, the walls forming said orifice being beveled at an angle not greater than forty-five degrees to form an upstream entrance in the shape of a frustum of a cone, the distance between the parallel faces of said frustum being less than the thickness of said orifice plate to provide a cylindrical surface adjacent the smaller diameter of said frustum and the angle of said frustum, and the diameter of said cylindrical surface and the length of said frustum being selected with reference to forces tending to increase and to decrease the discharge coefficient to produce for variable flow of fluid a substantially constant coefficient of discharge irrespective of the changes in the viscosity of the fluid.

10. An orifice plate having an opening and forming a constriction in a conduit for the measurement of fluid flowing therethrough, means for preventing change in the discharge coefficient of said opening comprising an entrance portion to said opening beveled at an angle between twenty degrees and forty-five degrees, and the quotient of the shortest diameter of said opening divided by the length of said beveled portion having a value between six and twelve.

11. An orifice plate having an opening and forming a constriction in a conduit for the measurement of fluid flowing therethrough, means for preventing change in the discharge coefficient of said opening comprising an entrance portion to said opening beveled at an angle between twenty degrees and forty-five degrees, the quotient of the shortest diameter of said opening divided by the length of said beveled portion having a value between six and twelve, and a cylindrical section of said opening extending from the inner end of said entrance portion to the opposite side of said plate, the length of said cylindrical portion being approximately two per cent of its diameter.

12. In a system for measuring the flow of fluid through a passageway within which is located a constriction forming a constricted fluid-passage, the combination of means responsive to the difference in pressure created between the upstream and downstream sides of said constriction for indicating the rate of flow of said fluid through said constriction and means for maintaining the square root value of said differential pressure proportional to the rate of flow with changes in fluid flow the flow criteria of which ranges below 22,500, comprising walls forming a beveled entrance to said fluid-passage, the angle of bevel being between twenty degrees and forty-five degrees and the quotient of the shortest diameter of said fluid-passage divided by the length of said beveled portion having a value between six and twelve, said angle and said quotient bearing a predetermined relation to each other for each value, between limits of substantially one-tenth and seven-tenths, of the quotient of said smallest diameter of said fluid-passage divided by the diameter of said passageway.

13. In a system for measuring the flow of fluid through a circular conduit within which is located an orifice plate, the combination of conduit connections extending from points on opposite sides of said orifice plate, pressure responsive means connected to said conduits for the measurement of the differential pressure across said plate and means whereby the square root values of said differential pressure are proportional to the quantity of fluid passing through said orifice plate for values of flow criteria below 22,500 comprising a beveled entrance to the orifice, the angle of bevel being between twenty degrees and forty-five degrees and the quotient of the shortest diameter of said orifice divided by the length of said beveled portion having a value between six and twelve, said angle and said quotient bearing a predetermined relation to each other for each value of the ratio of said smallest diameter of said orifice to the diameter of said passageway, said ratio having a value not below one-tenth and not above seven-tenths.

14. In a system for measuring the flow of fluid through a circular conduit within which is located an orifice plate, the combination of conduit connections extending from points on opposite sides of said orifice plate, pressure responsive means connected to said conduit-connections for the measurement of the differential pressure across said plate and means whereby the square root values of said differential pressure are proportional to the quantity of fluid passing through said orifice plate for values of flow criteria below 22,500 comprising a beveled entrance to the orifice, the angle of bevel being between twenty degrees and forty-five degrees, and the quotient of the shortest diameter of said orifice divided by the length of said beveled portion having a value between six and twelve, said angle and said quotient bearing a predetermined relation to each other for each value of the ratio of said shortest diameter of said orifice to the diameter of said conduit lying between approximately one-tenth and seven-tenths, said orifice having a cylindrical section concentric with said beveled entrance, the diameter of said section being equal to said shortest diameter of said beveled entrance and the length of said section being approximately two per cent of its diameter.

15. In a system for measuring the flow of fluid through a cylindrical conduit within which is located an orifice plate, the combination of means responsive to the difference in pressures on opposite sides of said plate, means for integrating square root values of the difference in pressures applied to said pressure responsive means, and means for maintaining the square root values of said difference in pressures proportional to the rate of flow of fluid through said orifice plate with flow criteria below 22,500, which are obtained by dividing the rate of flow in weight units by the product of the smallest orifice diameter and the absolute viscosity comprising a conical entrance to the orifice terminating in a cylindrical portion whose length is substantially two per cent of said smallest orifice diameter, the included angle of said conical entrance being between forty degrees and ninety degrees and the quotient of said smallest diameter of said orifice divided by the length of said beveled portion having a value between six and twelve, said angle and said quotient bearing a predetermined relation to each other for each value of the ratio of said smallest diameter of said orifice to the diameter of said conduit, said ratio having a value not below one-tenth and not above seven-tenths.

16. Structure for measurement of flow of fluid in a conduit comprising means defining a fluid-passage for development on opposite sides thereof of a differential pressure, the smallest diameter of said passage ranging from one-tenth to seven-tenths the internal diameter of the conduit, and said fluid-passage having an entrance portion converging, in the direction of flow, toward the axis of said passage at an angle not greater than 45° and not less than 20°.

17. Structure for measurement of flow of fluid in a conduit, comprising means defining a fluid-passage for development on opposite sides thereof of differential pressures substantially proportional to the squares of the rates of flow of fluids throughout a range of flow criteria between an approximate lower limit of 100 and an upper limit of at least 22,500, said fluid-passage having an entrance portion converging, in the direction of flow, toward the axis of said passage, at an angle ranging from about 45° as an upper limit to about 20° as a lower limit according as the smallest diameter of said fluid-passage ranges between approximately one-tenth and seven-tenths the internal diameter of the conduit.

18. Structure for measurement of flow of fluid in a conduit comprising means defining a fluid-passage for development on opposite sides thereof of differential pressures substantially proportional to the squares of the rates of flow of fluids throughout a range of flow criteria between an approximate lower limit of 100 and an upper limit of at least 22,500, said fluid-passage having an entrance portion converging, in the direction of flow, toward the axis of said passage at an angle ranging from about 45° as an upper limit to about 20° as a lower limit, according as the ratio of the smallest diameter of said fluid-passage to the length of the converging portion of said passage as measured axially thereof, varies from about 12 to about 6.

19. Structure for measurement of flow in a conduit comprising means defining a fluid-passage for the development on opposite sides thereof of differential pressures substantially proportional to the squares of the rates of flow of fluids throughout a range of flow criteria between an approximate lower limit of 100 and an upper limit of at least 22,500, said fluid-passage having an entrance portion converging in the direction of flow toward the axis of flow at an angle ranging from about 45° as an upper limit to about 20° as a lower limit according as the smallest diameter of said fluid-passage ranges between approximately one-tenth and seven-tenths the internal diameter of the conduit, and as the ratio of the smallest diameter of said fluid-passage to the length of its converging portion, as measured axially of said passage, ranges from about 12 to about 6.

20. Means for developing differential pressures substantially proportional to the squares of the rates of flow of fluids having substantially different viscosities throughout a range of flow criteria between an approximate lower limit of 100 and an upper limit of at least 22,500 comprising a fluid-conduit, means defining within said conduit a constricted fluid-passage having an entrance converging, in the direction of fluid flow, toward the axis of said passage at an angle not greater than 45° and not less than 20°, according as the smallest diameter of said passage ranges between approximately one-tenth and seven-tenths of the internal diameter of the conduit.

21. Structure for measuring rates of fluid flow in a conduit comprising means defining a constricted fluid-passage which upon fluid flow therethrough gives rise to forces respectively tending to increase and to decrease its discharge coefficient, the entrance portion of said passage converging, in the direction of flow, toward the axis of flow at an angle ranging from about 20° to about 45°, and the convergence of said entrance portion, the peripheral area thereof, and the ratio of the smallest diameter of said passage to the diameter of said conduit so related as to balance said forces, and thereby maintain constant said discharge coefficient for flow criteria below 22,500 and above 140.

22. An orifice plate defining a fluid-passage, the entrance portion thereof so converging, in the direction of flow, toward its axis, and the length of said converging entrance portion measured along said axis, being such that the coefficient of discharge of the orifice plate remains sensibly constant for all flow criteria above approximately 100.

HORACE E. DALL.